UNITED STATES PATENT OFFICE.

RUSSELL FISK, OF NEW YORK, N. Y.

IMPROVED COMPOUND FOR PAVEMENTS, ROADWAYS, &c.

Specification forming part of Letters Patent No. 95,673, dated October 12, 1869.

*To all whom it may concern:*

Be it known that I, RUSSELL FISK, of the city, county, and State of New York, have invented a new and Improved Compound for Roadways, Pavements, &c.; and I do hereby declare that the following is a full, clear, and exact description thereof, which will enable others skilled in the art to make and use the same.

This invention relates to new and useful improvements in compounds to be used in connection by admixture with sand, gravel, broken stone, cinders, and other like matters, for the construction of sidewalks, pavements, tile, brick, and artificial stone.

My improved compound consists of the following ingredients, mixed in the proportions as below:

Boiled linseed-oil, one part; melted resin, five parts; petroleum-oil, one part, (or, in some cases, I use either one of the oils without the other;) pitch, five parts; tar, five parts; or, according to circumstances, I use either the tar or pitch separately, with each or all of the above - named ingredients, in manufacturing different articles or constructing pavements, roadways, &c.

This compound I use with sand, gravel, broken stone, cinders, or other approved material, to cause the adhesion of the same to form solid pavements, blocks, artificial stone, and the like.

Having thus described my invention, I claim as new and desire to secure by Letters Patent—

1. The improved compound consisting of the ingredients above stated, mixed in the proportions as described, either in whole or with the exceptions stated as to the oils, tar, and pitch, substantially as specified.

2. The combination of the herein-described improved compound with sand, gravel, broken stone, cinders, and other like matters, in the construction of solid pavement, artificial stone, tile, and brick, substantially as specified.

The above specification of my invention signed by me this 4th day of September, 1869.

RUSSELL FISK.

Witnesses:
GEO. W. MABEE,
EDUARD MARTIN.